United States Patent [19]

Paquette et al.

[11] 3,998,091
[45] Dec. 21, 1976

[54] TEST APPARATUS FOR DETERMINING QUALITY OF PACKAGING FOR VACUUM PACKAGED PRODUCTS

[76] Inventors: Michael W. Paquette, 4044 W. Palo Verde, Phoenix, Ariz. 85019; John I. Hess, 4201 Norwalk Drive, No. 310, San Jose, Calif. 95129; William J. Haber, 1525 E. Northshore Drive, Tempe, Ariz. 85283

[22] Filed: June 23, 1975

[21] Appl. No.: 589,357

[52] U.S. Cl. .................................. 73/52; 73/49.3
[51] Int. Cl.² ...................................... G01M 3/00
[58] Field of Search ........... 73/49.3, 52, 45.4, 88 R

[56] References Cited

UNITED STATES PATENTS

| | | | |
|---|---|---|---|
| 2,011,332 | 8/1935 | Chapman | 73/45.4 |
| 2,093,429 | 9/1937 | Foss | 73/49.3 |
| 2,512,134 | 6/1950 | Baule | 73/52 |
| 3,441,132 | 4/1969 | Browning | 73/52 |

Primary Examiner—James J. Gill
Assistant Examiner—Anthony V. Ciarlante
Attorney, Agent, or Firm—H. Gordon Shields

[57] ABSTRACT

Apparatus is disclosed which holds a vacuum packaged product and applies a stress on the package to determine the quality of the package by measuring package deflection resulting from the stress.

30 Claims, 6 Drawing Figures

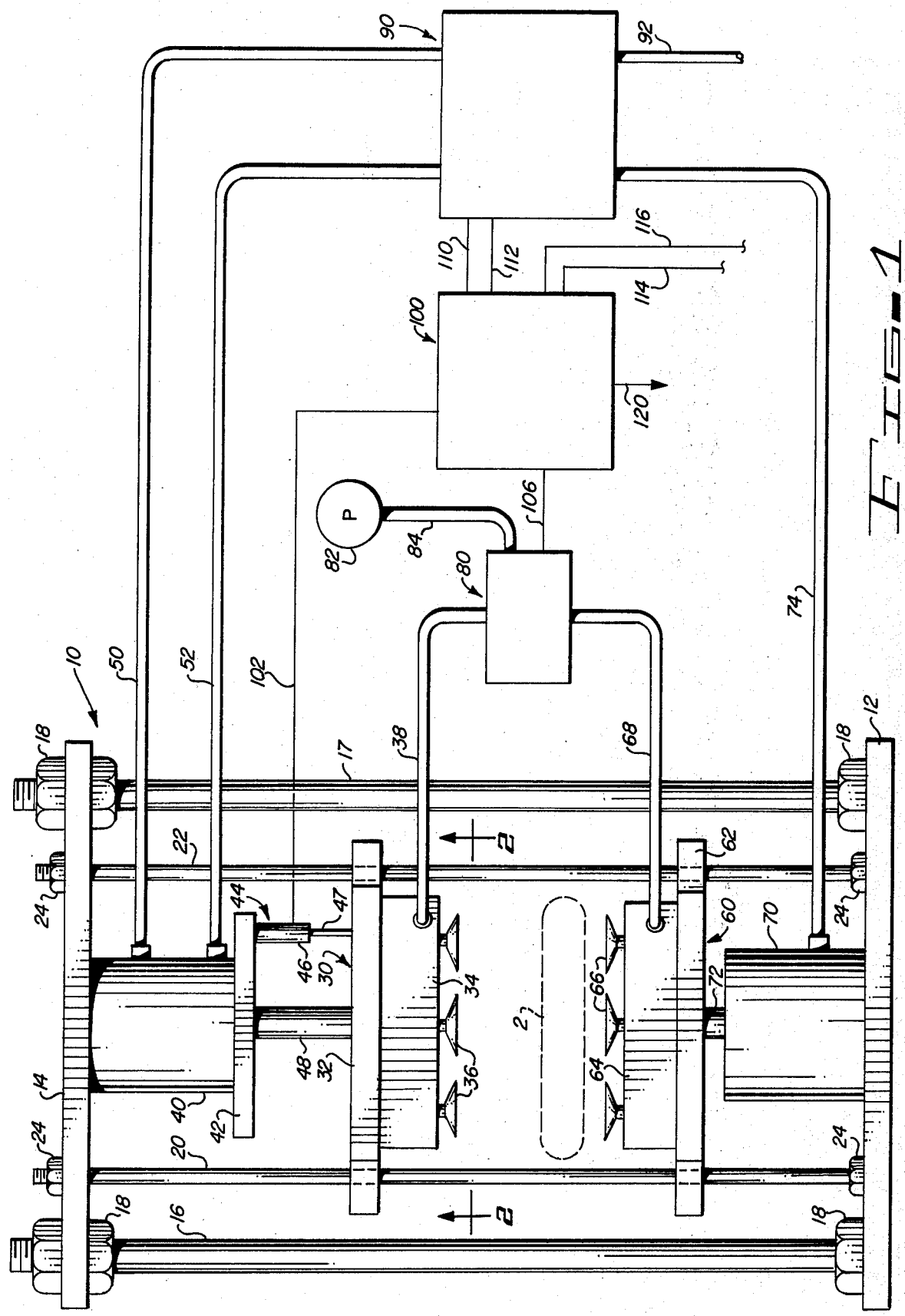

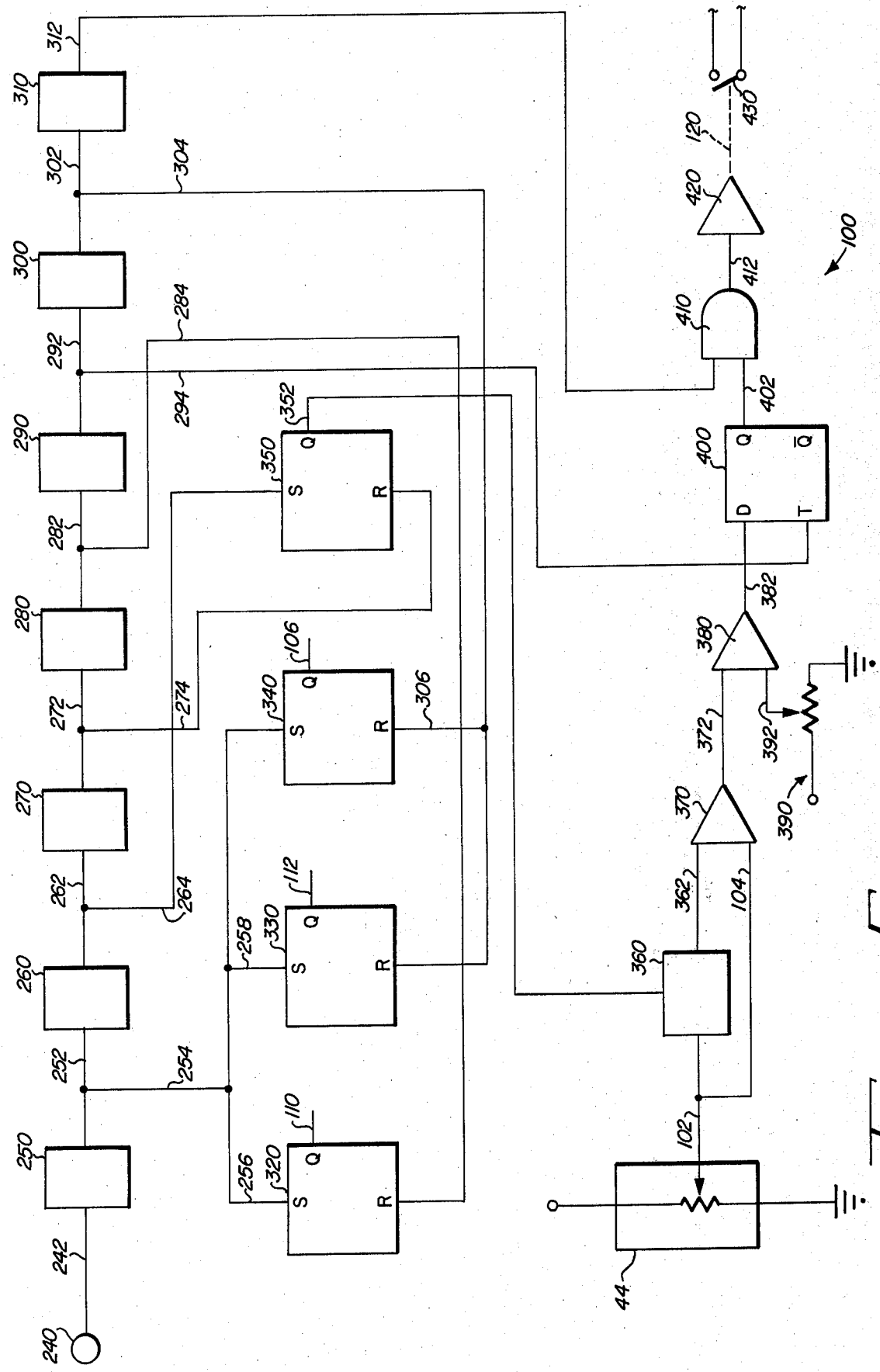

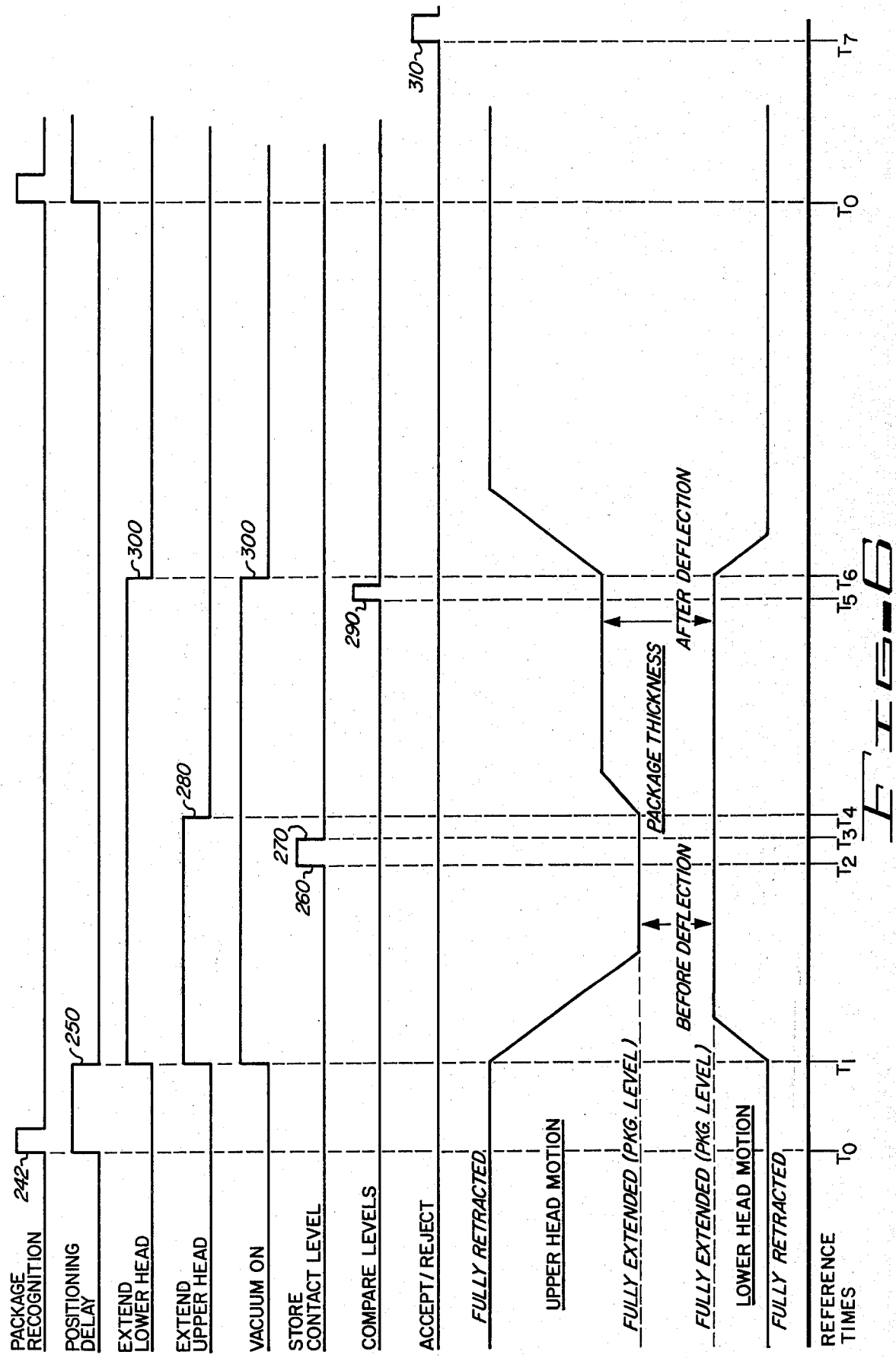

TEST APPARATUS FOR DETERMINING QUALITY OF PACKAGING FOR VACUUM PACKAGED PRODUCTS

BACKGROUND OF THE INVENTION

1. Field of the Invention:

This invention relates to quality testing apparatus for vacuum packaged products and, more particularly, to apparatus for testing the quality of packaging of vacuum packaged products by applying a stress to the package.

2. Description of the Prior Art:

Various types of pre-cooked meat products, such as bacon, wieners, and luncheon meats, are vacuum packaged in flexible plastic packages. The flexible package is theoretically sealed tightly so as to preclude the entrance into the package of ambient air pressure. As long as the package is free from holes and is sealed properly, ordinary refrigeration of the meat product and/or products, such as in stores, will prevent spoilage of the meat. However, if the package is not sealed properly, or if a pin hole leak develops in the package, the vacuum is lost and ambient air pressure is allowed to enter the package and spoilage of the meat results. A substantial percentage of packages are "leakers" as the result of such deficient packages. At the present time, and under prior art methods, there is no way to detect such leakers unless there is a noticeable defect in the package. The term "noticeable" is used to mean a hole or defect in the seal of a package which is large enough to admit sufficient air in the fifteen to sixty seconds between packaging and boxing to cause separation of the packaging film from the contents which can be detected by the naked eye. Unless a package defect is in a noticeable place or is rather large, the defect will probably not be detected and such leaker packages will be shipped out of the processing plant and to the ultimate point of distribution, such as a retail store.

Depending on the size or extent of the leak or defect in the package, spoliation will occur over a period of time. The length of time of course depends on the extent of the defect in the package. Regardless, any leaker will result in the spoiling of the meat product prior to the normal or expected shelf life of a well-sealed package.

While there are detection apparatus for determining surface leakage, such apparatus are limited in their scope to determining only the fluid tightness of a surface by vacuum methods. That is, a vacuum suction head of some kind is applied to the surface to be detected, and by pulling a vacuum on the surface, any leakage through the surface, for example through a sealed hole, from a rivet, bolt, or the like, may be detected by monitoring the vacuum pressure. Such apparatus is disclosed in U.S. Pat. No. 3,524,342, dated Aug. 18, 1970.

Similar apparatus is disclosed in U.S. Pat. No. 3,501,945, dated Mar. 24, 1970. The apparatus disclosed in the patent is directed to testing linings of closures, such as sealing rings, by applying a vacuum within the area of the sealing ring against a liner. If the sealing ring is defective, a flow of air will move through the sealing ring into the vacuum tester and will be detected thereby.

The types of apparatus disclosed in the two referenced patents are typical of the prior art, but are limited in their scope with respect to the detection of sealing defects or pin holes such as in vacuum packaged meat products. Accordingly, apparatus such as disclosed in the referenced patents is not applicable to solve the problems of the meat packing industry.

The prior art also includes apparatus such as disclosed in U.S. Pat. No. 3,117,441, dated Jan. 14, 1964. The apparatus described in this patent is for testing the quality of packaging of vacuum packaged products by submitting the package to a vacuum environment in a vacuum chamber. The pressure within the chamber is first decreased below that of the vacuum package to distend the package and is then increased. The pressure within the chamber is determined after the package has returned to a predetermined amount of distention. The chamber pressure is then compared to a predetermined value which indicates the condition of the package. The apparatus is rather time consuming to use, due to the many steps included in the testing process. The chamber is first opened, a package is inserted, and the chamber is then closed, sealed, and evacuated. The pressure within the chamber is decreased until the package has reached a given size, and the chamber pressure is then increased to atmospheric. The chamber is then opened, the package is removed and another package is inserted. The multiplicity of steps and the timing make the apparatus useful primarily for statistical quality control or for relatively slow production lines.

SUMMARY OF THE INVENTION

The apparatus disclosed and claimed herein includes a pair of vacuum heads which attach to a package and a force is exerted through the heads onto the package to deflect the package. The deflection of the package is measured and by comparison and logic circuits the force and displacement is evaluated to determine the quality of the vacuum package on the basis of predetermined parameters. The apparatus includes test heads, a vacuum system, logic and comparison circuitry, and support structure for the apparatus.

Among the objects of the present invention are the following:

To provide new and useful package testing apparatus;

To provide new and useful apparatus for testing packaging of vacuum packaged products;

To provide new and useful apparatus for providing a stress on opposite sides of products and to measure the displacement resulting from the stress;

To provide new and useful apparatus for comparing stress deflection of packaging to predetermined parameters;

To provide new and useful apparatus for detecting vacuum defects in the packaging of vacuum packaged products; and To provide a new and useful method of determining the quality of packaging of a vacuum packaged product.

BRIEF DESCRIPTION OF THE DRAWING

FIG. 1 is a view, including a partial schematic diagram, of apparatus embodying the present invention.

FIG. 5 is a schematic circuit diagram of the logic and comparison circuitry of the present invention.

FIG. 6 is a schematic representation of the timing and sequence of events of the apparatus of the present invention.

DESCRIPTION OF THE PREFERRED EMBODIMENT

Figures 3, 4:
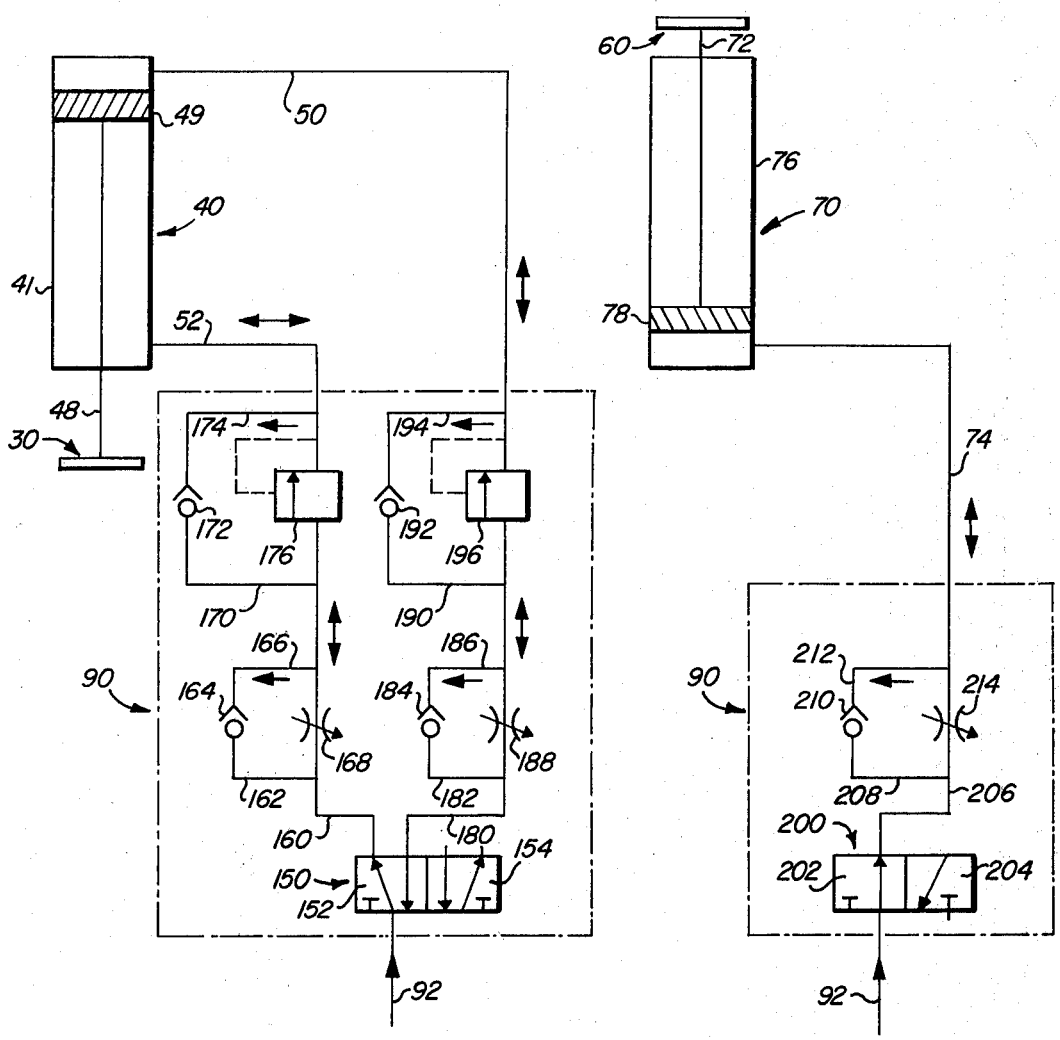
FIG. 3 is a schematic diagram of the control system for operating a portion of the apparatus of FIG. 1.
FIG. 4 is a schematic diagram of a control system for operating another portion of the apparatus of FIG. 1.

FIG. 1 is a partial schematic diagram and a view of apparatus embodying the present invention. The apparatus includes several primary components, including a test stand 10, vacuum controls 80, pneumatic controls 90, and comparison logic and timing circuitry apparatus 100. The vacuum control 80, pneumatic controls 90, and circuitry 100 are shown schematically as blocks. They will be discussed in detail in conjunction with FIGS. 3, 4, 5, and 6.

The test stand 10 includes a bottom plate 12 and a top plate 14. The two plates are secured together by a plurality of tie rods, of which tie rod 16 and tie rod 17 are shown in FIG. 1. The tie rods are threaded rods or studs which extend, at their lower ends, into tapped apertures in plate 12 and which extend, at their upper ends, through apertures in upper or top plate 14. A plurality of nuts, such as nuts 18, are used to secure the tie rods to the respective plates. With respect to the lower plate 12, only a single nut 18 is required to secure the rods into the tapped apertures in plate 12. With respect to the upper or top plate 14, a nut 18 is disposed beneath the plate and another nut 18 is disposed on top of the plate. The plate is accordingly securely held between the two nuts on each tie rod. The tie rods are threaded at both ends, but the threads extend axially along the rod for a longer distance at the upper end, adjacent plate 14, than at the lower end adjacent plate 12.

A pair of guide rods 20 and 22 also extend between bottom or lower plate 12 and upper or top plate 14. The pair of guide rods 20 and 22 are substantially the same as the tie rods 16 and 17, except that rods 20 and 22 are of smaller diameter. The rods 20 and 22 are threaded at both ends, and extend into a pair of tapped apertures in the bottom plate 12 and are secured therein by nuts 24. The rods 20 and 22 also extend through a pair of apertures in the top plate 14 and are secured to the plate by nuts 24. The rods 20 and 22 are spaced apart a less distance than are the rods 16 and 17. Accordingly, the rods 20 and 22 are disposed between the rods 16 and 17. While there are preferably four tie rods, of which only rods 16 and 17 are shown in FIG. 1, there need only be a pair of guide rods, such as rods 20 and 22, to provide the function of guiding portions of the test apparatus between the plates 12 and 14.

An upper test head 30 moves upwardly and downwardly on the guide rods 20 and 22 beneath a pneumatic actuator 40, which is secured to upper or top plate 14. The upper test head 30 includes a plate 32, which includes linear bearings through which the guide rods 20 and 22 extend, and a vacuum head 34, which is disposed beneath the plate 32 and secured, by appropriate fastening means, to the plate. The fastening means preferably allows for lateral motion and guidance between the vacuum head and the plate in order to accommodate the head to package dimensions which may vary from package to package. The vacuum head includes a vacuum chamber within the head. A plurality of suction cups 36 are secured to the vacuum head 34 and they communicate with the vacuum chamber within the head. The vacuum head 34 is connected to the vacuum control apparatus 80 by a vacuum line or conduit 38. The vacuum line 38 communicates with the vacuum chamber within the vacuum head and provides a source of vacuum for the cups 36.

The pneumatic actuator 40 is appropriately secured to the upper plate 14. It comprises a cylinder with appropriate pneumatic ports at the upper portion and at the lower portion of the cylinder with a piston moving between the ports. The ports provide for the admittance and release of compressed air to the actuator on opposite sides of the piston for moving the piston. At the upper portion of the cylinder a pneumatic line or conduit 50 connects with the upper port and extends to the pneumatic control unit 90. At the lower portion of the actuator, a pneumatic line or conduit 52 connects with the actuator and extends also to the pneumatic control unit 90. The respective pneumatic lines 50 and 52 connect to the ports, as discussed above.

Beneath the actuator, and substantially parallel to the upper plate 14, is a plate 42. The plate is appropriately secured to the pneumatic actuator 40. Connected to the plate 42 is a displacement sensor 44. The sensor includes a cylinder 46 and a movable rod 47 which moves in and out of the cylinder 46. The rod 47 is appropriately secured to the plate 32 of the upper test head 30.

An actuator or piston rod 48 is secured to the plate 32 of the upper test head and it is also secured to the piston within actuator 40. Accordingly, the upper test head 30 moves upwardly and downwardly in accordance with the movement of the piston within actuator 40. The piston within the actuator, secured to the rod 48, in turn moves upwardly or downwardly in response to the pneumatic controls as manifested by air pressure through lines 50 and 52.

Movement of upper test head 30 is sensed by the movement of the rod 47 with respect to the cylinder 46 of the displacement sensors 44 Typically, such displacement sensors are well known, and preferably sense displacement in accordance with the changing inductance field or flux field resulting within a sensor cylinder from movement of a rod. The sensor is connected to the comparison, logic, and timing circuitry unit 100 by a conductor 102, which extends between the cylinder 46 and the circuitry unit 100.

Disposed in substantial alignment with upper head 30, and also movable on guide rods 20 and 22, is lower test head 60. The lower test head includes a plate 62 which includes a pair of apertures through which the guide rods 20 and 22 extend. The plate preferably includes low friction linear bearings in the pair of apertures through which the guide rods extend and on which the plate and head moves. Above the plate 62, and appropriately secured thereto, is a vacuum head 64 which is substantially the same as the vacuum head 34 of the upper test head 30. The vacuum head 64 includes a vacuum chamber therein which is substantially the same as the vacuum chamber within the upper head 34. Attached to the vacuum head 64, and extending upwardly therefrom, are a plurality of vacuum cups 66. The vacuum cups communicate with the vacuum chamber within the head 64, again substantially the same as with respect to the vacuum cups 36 of the upper head 30. The lower test head, similar to the upper test head, is preferably movable laterally on the plate to allow appropriate conformance of the test head to variations in package size, location, and orientation. Such lateral motion is well understood in the art.

Vacuum for the cups 66 of the lower test head 60 is provided through a conduit 68. The conduit or vacuum line 68 extends from the vacuum control apparatus 80 to the lower test head 60. The line 68 extends and is secured to a port on the vacuum head 64 which in turn is in communication with the vacuum chamber within the head.

The lower test head 60 is movable on the guide rods 20 and 22 in response to movement of a piston rod 72 which is secured to a piston within a pneumatic actuator 70. Pneumatic actuator 70 is in turn secured to and disposed on lower plate 12. The actuator 70 comprises a cylinder in which is disposed a movable piston. The piston in turn is secured to the rod 72 and movement of the piston results in movement of the lower test head 60. The piston is spring loaded to the "down" position to cause the piston and the test head to move downwardly when no pressure is applied to the cylinder.

A single pneumatic line 74 extends from the pneumatic control unit 90 to the lower portion of the pneumatic actuator 70. The line 74 is connected to a port on the pneumatic actuator which communicates with the interior of the actuator beneath the piston disposed within the actuator.

In operation, the test stand 10 is located adjacent, and preferably straddling, a conveyor belt or other system in the production line of the appropriate packaged goods to be tested.

In FIG. 1, a package 2, which may be a typical meat product, such as wieners, contained or wrapped in a flexible, deformable package, is shown in phantom disposed above the lower test head 60. Such package would be held in place by a conveyor system of some type and be moving along at a relatively uniform speed and at a relatively uniform spaced-apart disposition with respect to other packages on the assembly line conveyor systen. Upon an appropriate signal from a package recognition or sensing system, which indicates that a package is in position for testing, an appropriate valve is opened in the pneumatic control unit 90 which allows pressurized air to flow through the pneumatic line 74 to the lower pneumatic actuator 70. With the pressurized air flowing into the actuator 70 beneath the piston therein, the piston will move upwardly in the actuator and this movement will in turn result in an upward movement of piston rod 72 and of the lower test head 60 secured thereto. As indicated above, the lower test head 60 is guided on the guide rods 20 and 22. The piston within the actuator 70 moves upwardly a predetermined distance which is sufficient to allow the suction cups 66 of the lower test head to contact the package 2 and to move the package upwardly off the conveyor belt or other conveying system on which it is moving.

As the lower test head is moving upwardly, a signal is transmitted to the vacuum control unit 80 which results in the opening of a valve to connect vacuum line 68 to a source of vacuum, such as vacuum pump 82. The vacuum pump 82 is connected to the vacuum control unit 80 by a vacuum line 84. The vacuum pump 82 is the vacuum source for both vacuum line 68 connected to the lower test head 60 and vacuum line 38 connected to the upper test head 30. Since the vacuum line 68 communicates with the vacuum chamber within vacuum head 64 of the lower test head, and since all of the vacuum cups 66 communicate with the vacuum chamber within the head, the package 2 will be subjected to the pull or suction force of the vacuum as the cups 66 contact the package. The package will be accordingly held in place securely on the lower test head 60 by the vacuum exerted through the cups 66.

At the same time the lower test head 60 is moving upwardly, a signal is transmitted to the pneumatic control unit 90 which results in air pressure being transmitted through pneumatic line 50 to the upper portion of the upper pneumatic actuator 40. With the pressurized air transmitted through pneumatic line 50 to the upper portion of the pneumatic actuator 40, the piston within the actuator moves downwardly. The pneumatic line 52 is opened to allow the air beneath the piston within the actuator to exhaust from the actuator when the pneumatic line 50 is pressurized. With the piston moving downwardly, the piston rod 48 secured thereto also moves downwardly, carrying with it the upper test head 30. The upper test head, as previously indicated, is substantially aligned with the lower test head and is also guided on the guide rods 20 and 22.

When the upper test head 30 begins its downward movement, another signal is also transmitted to the vacuum control unit 80 which results in the vacuum line 38 being connected to the source of vacuum, such as pump 82, by vacuum line 84. The vacuum line 38 extends from the vacuum control unit to the upper vacuum head 34 and to the vacuum chamber therein. The vacuum chamber in turn communicates with the suction cups 36 to provide a source of vacuum to each one of the cups. The operation of the vacuum heads, both the upper vacuum head 34 and lower vacuum head 64, with their respective cups 36 and 66, operate substantially in the same manner. Moreover, as previously mentioned, they may move laterally to accommodate as required to different packages.

In the downward movement of the upper test head 30, the cups 36 will contact the upper surface of package 2. At the time of contact, or after a contact level is established, as explained below, the upper test head will cease its downward movement and will begin to reverse itself. The cups 36 contact the upper surface of the package 2 and are secured thereto by the force of the vacuum communicated to the package through the cups 36. When the contact with the package is made, both the upper cups and the lower cups hold firmly and are thus secured to the package on opposite sides of the package under the vacuum pressure provided by the vacuum pump 82. At this time, in accordance with an appropriate signal, and after the contact level of the upper head has been measured, as discussed in detail below, the upper test head moves upwardly as appropriate valving is accomplished by the pneumatic control unit 90 to cause pressurized air to flow through pneumatic line 52 to flow to the lower portion of the pneumatic actuator 40 beneath the piston therein. At the same time, appropriate valving is actuated to allow for the exhaustion of the air within the upper portion of pneumatic actuator 40 above the piston therein through pneumatic conduit or air line 50.

At the time of the cessation of downward movement of the test head 30, an appropriate signal is transmitted to the comparison, logic, and timing circuitry 100 from the displacement sensor 44. The signal transmitted to the circuitry by the sensor results in a comparison signal against which the deflection of the package occasioned by the upward movement of the upper test head will be compared by the comparison, logic, and timing circuitry. As the upper test head moves upwardly with its suction cups affixed to the package, the deflection of the skin of the package, or covering of the package, will be an indication of the quality of the seal of the package. That is, the deflection of the skin of the package under ideal conditions of a seal of the package which is acceptable is readily known. Hence, an increase in the deflection of the package results from imperfect seals of various types, such as pinhole leaks, failures to seal, and the like. Since the various parameters have been established for qualities of seals, the extent of the deflection of the package skin may be translated in terms of quality of the seal, and such is accomplished by the comparison, logic, and timing circuitry 100.

The lower test head 60 is moved upwardly a specified distance in order to contact the bottom or lower surface of the package as the package comes down the assembly line conveyor system. The upper test head, however, moves downwardly until contact is made with the upper surface of the package. The distance which the head travels in contacting the package is immaterial with respect to the comparison to be made on the package, otherwise the variations in thickness of the packages could have a bearing on the outcome of the tests. Thus the upper test head moves downwardly until the package is contacted, and the point of contact, as sensed by the apparatus, becomes a reference point for the beginning of the test on the package. The reference point is determined in accordance with the location of the rod 47 with respect to the displacement cylinder 46.

The suction cups 66 and 36 of the lower and upper test heads, respectively, make contact with, also respectively, the lower surface and the upper surface of the test package. The suction cups and the respective test heads are substantially self aligning so as to appropriately and positively make contact with the surfaces of a package to be tested. Accordingly, the configuration of the test heads, and/or the orientation, size, and number of suction cups may vary according to the type of package to be tested by the apparatus.

Once a package has been contacted and secured by the suction cups of the test heads, the upper test head moves upwardly in response to the pneumatic pressure supplied to the pneumatic actuator 40 through the pneumatic line 52 in response to the control of the apparatus through comparison, logic, and timing circuitry 100. Thus a force is applied to stress the package from opposite sides in order to deform or deflect the package.

The pneumatic control unit 90 determines direction, speed, and force of the pneumatic actuators 40 and 70. Accordingly, after the upper test head 30 has contacted the package, the pneumatic actuator is reversed and moves upwardly at a predetermined speed and with a predetermined force. That is, the force exerted by the upper test head on the package 2 is controlled or limited so that the deflection of the package may be appropriately measured and compared by the circuitry 100. With the limited or predetermined force exerted upwardly by the test head, the deflection of the package is measured and compared in accordance with the signals of the displacement sensor 44. Utilizing the data provided, in terms of force and distance, with respect to the package, the comparison, logic, and timing circuitry unit 100 determines whether the package is properly sealed and should accordingly be accepted, or whether the package is improperly sealed, and should be rejected. The results of such comparison are transmitted by the circuitry 100 in terms of the quality signal or the lack of a signal, on conductor 120. The signal 120 comprises the output for the apparatus, and it consists of an acceptance signal which is the absence of an output, or a rejection signal, as pertains to the quality of the seal on the package 2. This will be discussed in detail below.

The comparison, logic, and timing circuitry 100 includes the control circuitry for controlling the pneumatic valve apparatus 90. FIG. 1 includes a pair of conductors 110 and 112 which extend between the circuitry 100 and the pneumatic control unit 90. The conductors 110 and 112 schematically represent the electrical circuitry which connects the pneumatic control unit to the circuitry apparatus. As previously stated, the pneumatic control unit controls the direction, speed, and force of the pneumatic actuators.

Included in the pneumatic control unit 90 are a plurality of valves and regulatory devices which are used to control the actuators. Since the actuators are pneumatic actuators, a source of pressurized air or air supply is provided to the pneumatic control unit 90 by a pneumatic or air line 92.

A conductor 106 is schematically shown extending between the circuitry apparatus 100 and the vacuum control unit 80. As above explained, the vacuum control unit 80 includes appropriate valving to control the vacuum transmitted to the vacuum heads 34 and 64 of the upper and lower test heads, respectively, through the vacuum lines 38 and 68. Downward movement of the upper test head 30 results substantially simultaneously in the vacuum line 38 being connected to vacuum pump 82 through vacuum line 84, and similarly the upward movement of lower test head 60 results in the actuation of appropriate valving to connect vacuum line 68 to the vacuum line 84 and to the pump 82.

The comparison, logic, and timing circuitry unit 100 derives power through a pair of input power conductors 114 and 116, which may simply be a nominal 110 volt alternating current source. If desired, the input electrical power may be transformed to or from a higher or lower voltage.

After the appropriate output signal 120 has been transmitted by the circuitry unit 100, the vacuum source 82 is disconnected from the vacuum lines 38 and 68, which results in the release of the package 2 by the suction cups 36 and 66. Substantially simultaneously, the lower test head 60 moves downwardly and the upper test head 30 moves upwardly and the package 2 is released and moves downwardly until it contacts the conveyor system from which it originated. As the package moves onto the conveyor system and proceeds along the conveyor system, the quality signal is interpreted in a go-no go or accept-reject mode. That is, the package is either allowed to continue along the conveyor system if the quality determination is a go or accept signal, or the package is moved off the conveyor system if the quality output signal 120 is interpreted as a reject or no go signal. Obviously, well known apparatus may be used to remove the package from the conveyor system if the package is rejected.

Figure 2:
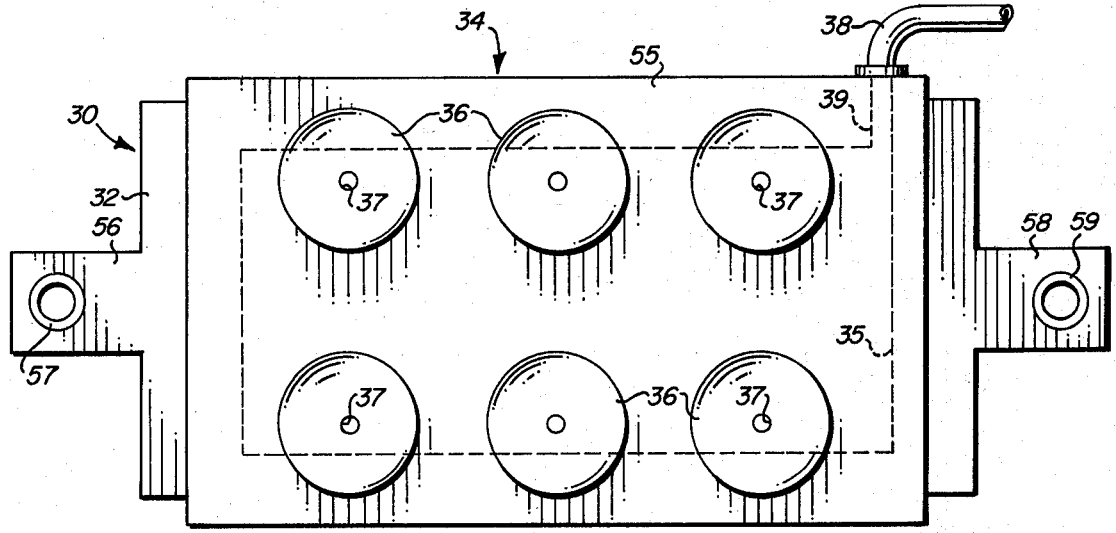
FIG. 2 is a view of a portion of the apparatus of FIG. 1 taken generally along line 2—2 of FIG. 1.

FIG. 2 is a view of the apparatus of FIG. 1 taken generally along line 2—2 of FIG. 1, and it comprises a view of the upper test head 30. The test head 30 is shown from the underneath, as viewed in FIG. 1.

The test head 30 includes the plate 32 and the vacuum head 34, appropriately secured together. The plate 32 is generally rectangular in configuration, with a pair of outwardly extending arms or extensions 56 and 58, which are generally symmetrical with respect to each other and to the plate 32. Each of the extensions include an aperture extending through the extension and a bearing disposed within the aperture. Extension 56 includes a linear bearing 57 and extension 58 includes a linear bearing 59, both respectively extending through the extensions of the plate. The guide rods, shown in FIG. 1, in turn extend through the linear bearings, and the test head moves on the rods, utilizing the bearings in the well-known manner.

The vacuum head 34 is appropriately movably secured to the plate 32, as discussed above. Within the vacuum head, and outlined in phantom, is a vacuum chamber 35. Only the outer outline of the vacuum chamber is indicated in FIG. 2. The vacuum chamber includes a port 39 to which is secured the vacuum line 38. Accordingly, vacuum line 38 communicates with the vacuum chamber through the port 39.

The vacuum head 34 includes a bottom surface 55, and the vacuum cups 36 extend outwardly, or downwardly, as shown in FIG. 1, from the surface 55. As indicated in FIG. 2, there are six vacuum cups 36 illustratively shown as connected to the vacuum head 34. Obviously, as many suction cups may be secured to the vacuum head as required for testing whatever type package the apparatus is to be used with, and the cups may be arranged in any desired pattern or orientation. The suction cups are preferably made of a relatively flexible material that will conform to the package surface on which it is disposed. For example, if packages of wieners are to be tested, the suction cup should be flexible enough to conform to the convolutions or ridges of the wieners, so as to provide sufficient adherence between the package and the cup to allow the apparatus to hold the vacuum against the package. Each of the cups includes a central conduit 37 which communicates with the vacuum chamber 35. Accordingly, there is vacuum communication between the vacuum chamber and the surface of the package which is to be tested. The conduit 37 is preferably centrally disposed with respect to each cup 36.

While the plate 32 has been described as secured to the vacuum head 34, obviously this is not limited to a fixed or unitary securement, but may rather be any type of appropriate attachment, such as one that would allow for self alignment between the plate 32 and the vacuum head 34 with respect to any packages, regardless of their size or configuration.

FIG. 3 is a schematic diagram of the pneumatic control system for operating the upper cylinder portion 40 of the apparatus of FIG. 1. As indicated above, the pneumatic actuator 40 comprises a cylinder 41 with a piston 49 disposed therein. A pair of pneumatic lines or conduits 50 and 52 are connected to the cylinder, above and below the piston, respectively, to provide a source of compressed air to the cylinder 41 to move the piston 49 upwardly and downwardly within the cylinder. The lines 50 and 52 extend to the pneumatic control block 90, shown in FIG. 1, and outlined in phantom in FIG. 3. Within the pneumatic control block 90 are the various pneumatic lines and control valves which are selectively actuated or engaged to allow the piston within the cylinder to move upwardly and downwardly as desired. The air supply line 92 (see also FIG. 1) connects with the apparatus within the pneumatic control block to provide a source of compressed air for actuating the piston within the cylinder.

The air supply line 92 is selectively connected to a directional control valve 150 within the pneumatic control block 90. The directional control valve 150 comprises a pair of control valves, control valve 152 and control valve 154. The control valve 152 is an up control valve, and the control valve 154 is a down control valve. That is, when air supply line 92 is selectively connected to the control valve 152, as illustrated, a supply of air is directed to the pneumatic actuator 40 beneath piston 49 to move the piston 49, and its piston rod 48, and accordingly the upper test head 30 secured to the piston rod 48 and schematically shown in FIG. 3, upwardly. Air flows from air supply line 92 through the up control valve 152 and through an air supply line 160, and through an air flow control valve 168, which is disposed in the air supply line 160, and through a pressure regulator 176, to the air supply line 52 to the actuator 40. The air flow control valve 168 governs the flow of air through the air conduit or line 160 to the line 52. The pressure regulator 176 controls the pressure of the air to control the force applied in the cylinder 41 beneath the piston. Thus the valve 168 comprises a flow control valve to control the speed of the piston while the valve 176 comprises a pressure regulator to control the force applied to the piston within the cylinder.

A branch air flow circuit extends around, or bypasses, the flow control valve 168. The branch circuit comprises a pair of conduits or air lines 162 and 166, which connect with the supply line 160 respectively beneath and above the air flow control valve 168. Between the two portions of the branch circuit, the lines 162 and 166, is a one-way check valve 164. The one-way check valve 164 is closed when the air supply line 92 is connected to the up control valve 152. This prevents the air from flowing through the valve 164 rather than through the air flow control valve 168. In other words, when the pneumatic actuator 40 is to be pressurized to raise the upper test head 30, all the air from the air supply line 92 flows through the air line 160 and through the air flow control valve 168. However, when the air supply line 92 is connected to the down control valve 154, the flow of air is reversed through air line 52 and air line 160 such that the air is allowed to flow through branch line 166, through the one-way check valve 164, and through the branch line 162 back to the line 160.

There is also a branch line around the pressure regulator 176, including a branch line or conduit 170, another one-way check valve 172, and branch line 174 which connects back with the line 160. The one-way check valve 172 prevents pressurized air flowing through air line 160 from air supply line 92 from bypassing the pressure regulator 176, but allows the air to bypass pressure regulator 176 and to flow through branch line 174 and branch line 170 when the air is flowing out of the pneumatic actuator 40 and outwardly through air line 52 when the line 52 and the line 160 are not connected to the air supply line 52 but rather are vented to atmospheric pressure.

When the air supply line 92 is connected within the up control valve 152 to the air line 160, and accordingly to air line 52, to provide pressurized air within the pneumatic actuator 40 beneath piston 49, the upper portion of the cylinder 41 above piston 49, is connected or vented to atmospheric pressure through air supply line 50. The supply line 50 is connected to air line 180 within the pneumatic control block 90. The air supply line 180 also includes an air flow control valve 188 and a pressure regulator 196, substantially the same as the air flow control valve and pressure regulator in air line 160. The air supply line 180 includes a branch line 182, a one-way check valve 184, and a branch line 186, connected in parallel with the air flow control valve 188. Another branch, including branch line line 190, one-way check valve 192, and branch line 194, is also connected in parallel with the pressure regulator 196.

The air flow control valve 188 provides the function of controlling the flow of air through air supply line 180 to the air supply line 50, which is connected to the pneumatic actuator 40 above the piston 49 within cylinder 41. The pressure regulator 196, also connected in air line 180, controls the force of the movement of the piston 49 by controlling the pressure in the line 180 and accordingly in line 50.

Branch line 182 extends from the air line 180 on one side of the air flow control valve 188, and the branch line 186 extends from the line 180 on the opposite side of air flow control valve 188. Between the branch lines 182 and 186 is a one-way check valve 184 that prevents the flow of pressurized air through air supply line 180 to bypass air flow control valve 188, but allows the air to bypass the air flow control valve when the line 180 is vented to atmospheric pressure, as when the piston 49 is moved upwardly in the pneumatic actuator 40 when air supply line 160 and air line supply line 52 are pressurized. Similarly, branch line 190 extends from the air line 180 on one side of pressure regulator 196, and branch line 94 extends from the line 180 on the opposite side of pressure regulator 196, and the one-way check valve 192 is disposed between the branch lines 190 and 194. The one-way check valve 192 prevents the flow of pressurized air through air line 180 from bypassing the pressure regulator 196, but allows the vented air or exhaust air to bypass the pressure regulator by flowing from air line 150, into air line 180, and through the branch lines 194 and 190 around the pressure regulator 196 and back to air line 180.

FIG. 4 is a schematic diagram of the control system for operating another portion of the apparatus of FIG. 1, namely the pneumatic actuator 70 which raises and lowers the lower test head 60. The pneumatic actuator 70 is basically a one-way actuator since it is primarily concerned with raising the lower test head 60 to lift a package to be tested from a conveyor belt or some other package handling or transporting apparatus by raising the test head 60 to a predetermined or fixed height. The actuator 70 includes a piston 78 movable within a cylinder 76. The piston rod 72 is secured to the piston 78 and is also secured to the test head 60. An air or pneumatic line 74 extends from the pneumatic control block 90, schematically represented by dotted line in FIG. 4, to the lower portion of the cylinder 78 of the pneumatic actuator 70 where it communicates with the interior of the cylinder beneath the piston 78. The air line 92, also illustrated in FIGS. 1 and 3, supplies pressurized air for operating the pneumatic actuator 70, as well as the pneumatic actuator 40, schematically shown in FIG. 3.

The air line 92 is connected to a directional control valve 200 which in turn includes two portions, an up or pressure valve 202 and a down or vent valve 204. The line 92 is automatically connected to the appropriate side or portion of the directional control valve 200, depending on the part of the test cycle involved. The directional control valve 200 is in turn connected to an air line or conduit 206 within the control block 90. Conduit 206 connects with the air line or conduit 74 which extends between the pneumatic control block 90 and the pneumatic actuator 70. Within the pneumatic control block 90, the air line 206 includes a branch line 208 and a branch line 212, with a one way check valve 210 between the branch lines 208 and 212. The branch lines 208 and 212 tie into the air line 206 respectively below and above an air control valve 214, which controls the flow of air through the line 206 and accordingly controls the speed of the movement of piston 76 within the actuator 70. The one way check valve 210 prevents pressurized air from bypassing valve 214, but allows the vented air to bypass the valve. Since the piston 76 moves only a predetermined distance, and is not concerned with the same type functional operations as is the pneumatic actuator 40, no pressure regulator is necessary. The primary function of the actuator 70 is to raise the lower test head 60 to a predetermined height or position where a package to be tested is available for the carefully controlled and regulated movement of the upper test head 30 (see FIGS. 1 and 3).

The one way check valve 210 prevents the flow of pressurized air through the branch lines 208 and 212 when the air supply line 92 is connected with the up or pressure valve 202 in one side of the directional control valve 200 to provide pressurized air to the air line 206. When the flow of pressurized air is from air line 92, through the pressure valve 202 and to air line 206, all of the flow of pressurized air is through the air flow control valve 214. However, when the test cycle is completed, and a package disposed on the lower test head 60 is to be returned to the conveyor belt or to other package handling apparatus, the pressurized air through supply line 92 is disconnected from the air line or conduit 206, and the line 206 is vented to atmospheric pressure through the down or vent valve 204 side of the directional control valve 200. The air from the pneumatic actuator 70 is then allowed to flow through branch lines 208 and 212 and one way check valve 210. A compression spring 79 is disposed within the cylinder 76 above piston 78. The spring provides a bias for returning the piston downwardly after the test sequence has been completed and the vacuum is removed from the test heads 30 and 60. The use of the spring element or member provides a spring loaded piston which obviates the necessity of pressurizing the top of cylinder 76 above piston 78 to return the piston to its downward position.

Through the control logic within the pneumatic control block 90, the action of the control valves 150 and 200, of FIGS. 3 and 4, respectively, is coordinated or correlated. That is, when the flow of pressurized air from air supply line 92 is disconnected from the air line 206, and air line 206 is vented to atmospheric pressure through the down or vent valve 204 to allow piston 76 to move downwardly, the flow of pressurized air from air line 92 is connected to the up control valve 152 of the directional control valve 150, illustrated in FIG. 3. This provides for the flow of pressurized air through air line 160 and air line 52 to the pneumatic actuator 40 beneath the piston 49 disposed within the actuator to cause the piston 49 to move upwardly. At the same time, the vacuum system (see FIG. 1) is vented to remove the vacuum pressure from both the upper test head 30 and the lower test head 60 to release the package whose test has just been completed, and accordingly to allow the package to move back onto the conveyor or other system when the lower test head 60 moves downwardly.

When the piston 49 moves upwardly within the upper pneumatic actuator 40, the air or pneumatic line 50, which is connected to the upper portion of the actuator 40 above piston 49 therein, is vented to atmospheric pressure through air line 180, and branch lines 190 and 194, and one way check valve 92 therebetween, and branch lines 182 and 186, and the one way check valve 184 therebetween.

When the supply line 92 is connected to the air line 206 to move piston 76 upwardly within pneumatic actuator 70, which in turn raises the lower test head 60 and removes a package from the conveyor line upwardly in preparation for its test, the air supply line 92 is connected to the down control valve 154 of the directional control valve 150. This results in pressurized air flowing through the air supply line 180, through the air flow control valve 188 and the pressure regulator 196, and through the air line or conduit 50 to the upper portion of pneumatic actuator 40 above piston 49. At the same time, the air line or conduit 52, which connects with the pneumatic actuator 40 beneath piston 49, is vented to allow the piston to move downwardly within the actuator. The downward movement of piston 49 results in the downward movement of the piston rod 48 and of the lower test head 30 secured thereto. When the test head 30 contacts the package held by the lower test head 60, the downward movement of piston 49 ceases, and the air supply line 92 is disconnected from the down control valve side 154 of the directional control valve 150 and is connected to the up control valve side 152 for supplying pressurized air to the lower portion of pneumatic actuator 40 to raise the piston 49 and the upper test head 30 connected to the piston rod 48. When the piston 76 moves upwardly within the pneumatic actuator 70, the vacuum system is turned on to allow the vacuum cups on the lower and upper heads to hold the package to be tested. Accordingly, the package disposed on the lower test head 60 is held in place as has been described above, and when the upper test head 30 contacts the package, the vacuum system also holds the package against the upper test head.

FIG. 5 is a schematic circuit diagram of the logic and comparison circuitry of the present invention. The figure comprises a plurality of one shot multivibrators, with virtually every step or discrete portion of the test sequence adjustable, depending on the various parameters of the packages and of the equipment, including speed, and the like, with which and for which the apparatus will be used.

The first signal is a beginning signal or output signal from a package recognition apparatus 240, which may be of any appropriate and well known type, and which simply signals that a package has entered the test area along a conveyor belt or the like. The package recognition device may be a mechanical device, in which a package moving along a conveyor belt physically touches and pivots an arm, resulting in a signal, or it may be a light beam type apparatus in which a light beam is interrupted by the presence of a package, and the interrupted light results in an output signal. Whatever the type of package recognition device used, the result is that when a package is recognized, an output signal results, and the output signal is transmitted on conductor 242 to a multivibrator 250. The multivibrator 250, after an appropriate delay, which is built into the multivibrator, transmits its output signal on a conductor 252 to multivibrator 260. The output signal is also transmitted by a conductor 254 to a set/reset type flip-flop 340. Connected to the conductor 254 are two other conductors, conductor 256, and conductor 258, which extend from the conductor 254, respectively, to a flip-flop 320 and a flip-flop 330, both of which are of the set/reset type. Accordingly, the output from multivibrator 250 is transmitted to multivibrator 260, and also to three flip-flops, flip-flops 320, 330, and 340.

The three flip-flops in turn provide output signals which perform three functions which are next in the sequence of testing a package. The flip-flop 320 provides an output signal on conductor 110 which causes the upper test head 30 (see FIGS. 1 and 3) to extend downwardly. The flip-flop 330 provides an output on conductor 112 which results in the upwardly extension of lower head 60 (see FIGS. 1 and 3). The flip-flop 340 provides an output on conductor 106 which is transmitted to the vacuum control block 80 (see FIG. 1) and which results in vacuum pressure being transmitted to the vacuum heads of the respective upper and lower test heads.

After the signal on conductor 252 has been transmitted to multivibrator 260, there is again a built-in delay before an output signal is transmitted from multivibrator 260 to multivibrator 270 on conductor 262. During the time delay built into the multivibrator 260, the lower head extends and raises the package to be tested from its conveyor system and into position for testing. At the same time, the upper test head moves downwardly and contacts the package. Vacuum pressure is applied to both the upper and the lower test head to allow the vacuum heads to securely hold the package.

Since the upper test head moves downwardly only until a package is contacted, the downward distance which the upper test head moves is sensed by the displacement sensor apparatus illustrated in FIG. 1. That distance is stored in a sample and hold amplifier 360 as the result of the output signal from multivibrator 260.

The input from displacement sensor 44 to the sample and hold amplifier 360 is continuous from when an output signal or pulse from multivibrator 72 is transmitted on conductors 262 and 264. The output pulse on conductor 264 sets flip-flop 350 which causes an output from flip-flop 350 to be transmitted on conductor 352 to the sample and hold amplifier 360.

When the downward motion of the upper test head stops or ceases after contacting the package, an output from multivibrator 270 results in an input pulse on conductor 274 to reset flip-flop 350. When flip-flop 350 is reset, the output on conductor 352 to sample and hold amplifier 360 ceases and the package level of the head is accordingly stored by the refusal of the amplifier to receive any more input information from the displacement sensor. The output from the amplifier 360, which changes or varies according to its input from the sensor, remains constant after the package level is stored, thus providing a reference against which the package will be tested. This will be discussed in more detail below.

The output of multivibrator 260 is transmitted to multivibrator 270 on conductor 262. A conductor 264 extends from conductor 260 to a flip-flop 350, which is also a set/reset type flip-flop. The output from flip-flop 350 is in turn transmitted to the sample and hold amplifier 360 by a conductor 352. The sample and hold amplifier 360, upon reception of the signal on conductor 352, stores the contact level at which the upper head contacts the package to be tested. The contact level stored by the amplifier 370 is in the form of a voltage transmitted by the displacement sensor apparatus 44 on conductor 102 (see FIG. 1).

The displacement sensor 44 has an output which comprises a variable voltage, depending on the location or position of the rod 47 with respect to the cylinder 46, and to the coil or other apparatus therein. This voltage is transmitted to the sample and hold amplifier 360 by conductor 102. Another conductor, conductor 104, is also connected to the sensor and conductor 102. The conductor 104 extends to a differential amplifier 370. The output of the sensor 44, in the form of a voltage, accordingly is transmitted from the displacement sensor 44 to both the sample and hold amplifier 360 and the differential amplifier 370.

After the time delay determined by multivibrator 260, during which time the lower test head is raised and the upper test head is lowered to contact the package being tested, the output signal from the multivibrator 260 on conductors 262 and 264 sets the flip-flop 350. The output from flip-flop 350 is transmitted to the sample and hold amplifier 360 by conductor 352. Prior to the receipt of the signal on conductor 352, the output voltage from displacement sensor 44 is transmitted directly through the sample and hold amplifier 360 to a differential amplifier 370 by a conductor 362 which extends between the amplifiers 360 and 370, as discussed above. The conductor 362, as connected to the amplifier 370, accordingly provides one of the two inputs to the amplifier 370. The other input to the amplifier 370 is by the conductor 104. When the signal on conductor 352 is received by the amplifier 360 from the flip-flop 350, the voltage output from the amplifier 360 to the amplifier 370 holds at the last voltage received on conductor 102 from the displacement sensor 44. Accordingly, the output between amplifiers 360 and 370 remains substantially constant, while the voltage from the displacement sensor 44 on conductor 104 varies according to the position of the upper test head 30 with respect to the displacement sensor 44. In this manner, the position of the upper test head as it contacts the package to be tested and stops its downward travel is used as a reference by "storing" the position of the test head at the time the test head contacts the package.

Multivibrator 270, after receiving its input signal on conductor 262 from multivibrator 260, also includes a built-in time delay before its output signal is transmitted on conductor 272 to multivibrator 280. During the time delay of multivibrator 270, the contact level detected by the displacement sensor 43 is stored in the sample and hold amplifier 360. The output from multivibrator 270 is transmitted to flip-flop 350 by conductor 274 which extends from conductor 272 to the reset input terminal of flip-flop 350. This resets flip-flop 350 and stops its enabling signal to the amplifier 360. When the next set signal on conductor 264 is received by the flip-flop 350, its output will again signal the sample and hold amplifier 370 to receive the level information from the sensor 44.

After again a delay determined by the parameters of the multivibrator 280, its output signal is transmitted to multivibrator 290 by conductor 282. Conductor 284 extends from conductor 282 to the reset input terminal of flip-flop 320. When flip-flop 320 is reset, the output on conductor 110 stops and the upper head accordingly reverses its movement of travel. When the flip-flop 320 is set, the output on conductor 110 signals the upper head to extend downwardly to the test position. When the upper head contacts the package to be tested, and stops in its downward movement, the position at which it stops is recorded, as discussed above. The upper head is now reversed and begins to move upwardly by the resetting of the flip-flop 320.

The downward movement of the upper test head stops when the package to be tested is contacted, and, obviously, slightly deformed due to the weight or force of the head moving downwardly. The amount of deformation of the contents of the package is slight and not harmful in any way to either the package or to the contents of the package. Such slight deformation may enhance the quality of the test and the results obtained therefrom. The force of the upper head contacting and pushing against the package provides the proper amount of force to insure that both the suction cups on the upper head and the lower head make secure contact with the package. Accordingly, a vacuum seal between the vacuum cups and the package is assured.

When the upper test head reverses its downward movement and begins to move up, the suction cups of the test head are securely held in place by the vacuum pressure against the package. The upper head moves upwardly until the forces on the upper head equalize. That is, when the force of the pneumatic actuator 40, in moving the test head upwardly, is balanced by the force exerted by the strength of the package, the movement of the upper head ceases. At that time, the package is deflected the maximum amount which it will deflect.

Since the contact level of the head and the package was recorded by the sample and hold amplifier, the output on conductor 362 is constant after the head ceases its downward movement and begins to move upwardly. During the upward movement of the test head, the second input to the differential amplifier 370 along conductor 104 changes according to the position of the upper head with respect to the displacement sensor 44. When the head ceases its upward travel, the output from the differential amplifier 370 on conductor 372 comprises the difference between the fixed voltage input on conductor 362 from the sample and hold amplifier 360, which represents the lowest position of the displacement sensor and the variable input voltage on conductor 104 from the displacement sensor 44, the most recent or last voltage of which represents the highest position of the sensor. The output on conductor 372 is transmitted to the comparator amplifier 380 as one input thereto. The comparator amplifier 380 includes the second input from the potentiometer 390. The potentiometer 390 provides a fixed or reference input to the comparator amplifier 380 on conductor 392. The potentiometer provides a reference signal that the comparator 380 may use in determining whether the package under test is to be accepted or to be rejected. The potentiometer 390 is variable, and accordingly the reference signal output therefrom may be varied according to the type package being tested by the apparatus.

The multivibrator 290 also has a built-in time delay which allows the upper test head to move upwardly to complete the test before an output signal from the multivibrator 290 is transmitted to multivibrator 300. During the built-in time delay of multivibrator 290, the events discussed in the preceding paragraphs relating to the testing and comparing of the signals is accomplished. The output from multivibrator 290 is transmitted to multivibrator 300 on a conductor 292. The output signal of multivibrator 300 is also transmitted to a flip-flop 400 on a conductor 294, which extends between conductor 292 and the flip-flop 400.

The flip-flop 400 includes a pair of inputs, identified as the D input and the T input. The D input to the flip-flop 400 comprises an output from the comparator amplifier 380 on conductor 382. This output of the amplifier, or input to the flip-flop, is in binary form, either a binary 0 or a binary 1.

If the difference between the inputs on conductors 372 and 392 to the comparator 380 is "acceptable," the comparator provides a binary 0 output on conductor 382 to the D input of flip-flop 400. The acceptable difference between the voltage input to the comparator is of course predetermined according to the test parameters established for each type of package. The difference between the two inputs to the comparator 380 represents the amount of deflection of the package under test as compared with the maximum allowable deflection. The test parameters for each package allow for a predetermined amount of deflection. If deflection is greater than the predetermined or allowable amount, the quality of the seal is such that the package is either a leaker or is in some other way deficient and the deficiency will ultimately result in spoilage of the product within the package. If the deflection is above the allowable amount, the package should be rejected. The output from comparator amplifier 380 will be a binary 1 when the difference between the reference input 392 and the input signal on conductor 372 from the differential amplifier 370 is beyond the allowable amount of tolerance in terms of a voltage signal.

The input to the flip-flop 400 on conductor 382 is accordingly either a binary 0 or a binary 1. This input is constantly being transmitted to the flip-flop 400 from the comparator 380. At the time the output signal from the multivibrator 290 is transmitted to multivibrator 300, the output from the multivibrator 390 is transmitted to the T or trigger input of the flip-flop 400. The presence of the T input accordingly allows the flip-flop to provide an output to an AND gate 410 on conductor 402. The output from flip-flop 400 to the AND gate 410 is similarly in binary form, either an 0 or a 1. If the test package has a deflection which is within the allowable tolerance, the output of flip-flop 400 will be a 0 output to the AND gate, corresponding to the output of comparator 380. However, if the deflection of the test package is not within the acceptable tolerances, the output from flip-flop 400 will be a binary 1, which is in keeping with a binary 1 input to the flip-flop 400 from the comparator amplifier 380.

After an appropriate delay, again built-in to the multivibrator 300, an output is transmitted from multivibrator 300 to multivibrator 310 on conductor 302. The output from the multivibrator 300 is also transmitted on conductor 304 to flip-flops 330 and 340. The conductor 304 extends to the reset terminal of flip-flop 330. A conductor 306 extends from conductor 304 to the reset terminal of flip-flop 340. Accordingly, the output signal from multivibrator 300 resets flip-flops 330 and 340. The resetting of flip-flop 330 causes the lower head to retract downwardly by turning off the output of the flip-flop on conductor 112, and the resetting of flip-flop 340 results in the vacuum system being turned off by turning off its output on conductor 106. When the vacuum system is turned off, the suction cups of both the upper heads and the lower heads release on the package and the package is accordingly freed.

When the package is released from the upper head, the upper head will resume its upward movement, preparatory to another test. When the lower head moves downwardly, it also awaits the next test sequence. The package, upon reaching its original position on the conveyor system, moves along with the conveyor system.

The output signal from multivibrator 300 to multivibrator 310 on conductor 302, in addition to the resetting of the flip-flops 330 and 340, also results in an output from multivibrator 310, also after an appropriate time delay. The output from multivibrator 310 comprises an output signal on conductor 312 to the AND gate 410. The output signal of the multivibrator 310 may be considered as a reject pulse which results in an output from the AND gate 410 providing there is also an input to the AND gate from the flip-flop 400. The input from the flip-flop 400 must be in the form of a binary 1 in order for the signal to be anded with the signal on conductor 312. As discussed above, when the output from flip-flop 400 is a binary 1, the significance of the output is that the package should be rejected because the measured deflection has been greater than that predetermined as an acceptable amount of deflection. Accordingly, the reject signal from the flip-flop 400 is anded or combined with the reject pulse from multivibrator 310 and an output from and AND gate 410 is transmitted to reject amplifier 420 by conductor 412.

On the other hand, if the output from flip-flop 400 is a binary 0, the input on conductor 402 to AND gate 410 will not result in an output from the AND gate 410 because the zero output from the flip-flop 400 is not an appropriate input signal to the AND gate 410 which the AND gate can combine with the reject pulse input from the multivibrator. This will result in no output on conductor 412 to the reject amplifier 420 and accordingly no output from the amplifier 420.

If the package under test is rejected or excess deflection, then there will be a binary 1 output from flip-flop 400 on conductor 402 to the AND gate 410. When the reject pulse from the multivibrator 410 is received by the AND gate 410, the gate is enabled and an output on conductor 412 to the reject amplifier 420 results. In turn, there is an output from the amplifier 420 on conductor 120 which comprises the qualify signal or output from the apparatus which is in turn transmitted to an appropriate device, such as a switch 430, schematically represented in FIG. 5. The output from the amplifier 420 is appropriately timed so that the package will be at a particular location along the conveyor belt so as to be acted upon by an appropriate rejection apparatus, such as a mechanical arm, or the like, which will deflect the package from the conveyor belt onto a reject belt, or into a bin, or other suitable action will occur. In FIG. 5, a switch 430 is schematically shown to represent that the quality signal or output on conductor 120 is appropriately transmitted to apparatus which rejects the package from the test and in turn the package is removed from the conveyor system onto an auxiliary or some other system for reprocessing.

Sequentially, after the output signal from multivibrator 300 results in the resetting of flip-flops 330 and 340, which causes the lower head to move downwardly and the vacuum system to turn off, the apparatus is ready for another test. Accordingly, during the time delay of multivibrator 310, another package may be tested by the apparatus. The spacing of the packages to be tested along the conveyor system may be such that the package recognition apparatus 240 may recognize a package to be tested prior to the output signal from the multivibrator 310, which results in the rejection of a package if such is accomplished.

During the time delay of the multivibrator 310, between the receipt of the input signal on conductor 302 and the transmittal of the output signal from multivibrator 310 on conductor 312, the lower head moves down to its minimum or starting position, and of course the vacuum has been released which releases a package from both the upper head and the lower head. When the vacuum is released, the upper head continues to extend itself upwardly to its position for the beginning of a new test cycle. Thus the output from package recognition apparatus 240 on conductor 242 to multivibrator 250 will start the apparatus on a new test sequence.

FIG. 6 is a schematic representation of the timing intervals and the sequence of events of the apparatus. The figure is divided into two portions, both of which are integrated together. The top portion of the figure, extending from left to right, sequentially indicates the various pulses or signals which result in some type of activity during the testing sequence. The bottom portion represents the motion of the upper and the lower test heads and also schematically represents the package deflection during the testing sequence.

In the upper left-hand corner of FIG. 1, the timing sequence is shown as beginning with package recognition. The line extending from left to right indicates a timing sequence and the pulses in the line indicates the output pulse or signal from the package recognition device, and the signal will be given the reference numeral of the device which originates or generates the signal. This same system is used for all signals and events during the testing sequence. The first signal generated by the package recognition apparatus is designated by the reference numeral 240, and occurs at reference point or time T0. This is the output signal of the package recognition device transmitted to multivibrator 250 (see FIG. 5) when the package recognition device or apparatus recognizes that a package is in position on a conveyor system, or the like, and ready to be tested. The signal from the package recognition apparatus is transmitted to multivibrator 250, which includes a built-in time delay. The time delay of the multivibrator 250 is noted in the second line in FIG. 6, identified as "positioning delay," and extends between time T0 and time T1.

At the end of the positioning delay time period, an output signal is transmitted by multivibrator 250, which causes three events to happen substantially simultaneously. The lower head is extended upwardly, the upper head is extended downwardly, and the vacuum system is turned on. These four events are shown as occurring at reference time or point T1 in FIG. 6. In the lower portion of FIG. 6, the upper and lower testing heads are represented as, for the upper head, being fully retracted, and for the lower head, also fully retracted, down to time T1. At time T1, the lower head moves upwardly and becomes fully extended between time T1 and time T2. Similarly, the upper head moves downwardly and becomes fully extended some time between time T1 and time T2. The difference between the height of the fully extended heads is the contact level or height which accounts only for the package thickness prior to the test. At time T2, a signal is transmitted by multivibrator 260 which causes the sample and hold amplifier (see FIG. 5) to store the contact level of the upper head. The signal pertaining to the storing of the contact level is generated ultimately by a flip-flop, which is set by the output from multivibrator 260. After a short time delay, multivibrator 270 generates a signal to reset the flip-flop which generates the store contact level signal. However, this reset signal is of no direct consequence in the testing as far as the timing sequence, and the like, is concerned.

The next signal of consequence is generated by multivibrator 280, and that signal resets the flip-flop which causes the upper head to extend. The multivibrator 280 generates a reset signal which reverses the direction of the upper head and causes it to retract by moving upwardly. This occurs at time T4. Accordingly, the package to be tested is then stressed between the lower head and the upper head as the upper head retracts upwardly.

After another time delay which allows the upper head to stabilize in its upward movement, with the package secured between it and the lower head, multivibrator 290 transmits a signal which results in the comparison of the package thickness before deflection and after deflection. The before deflection thickness was stored in a sample and hold amplifier (see FIG. 5) as the result of an output signal by multivibrator 260. The thickness of the package is continually monitored during the upward movement of the upper head and after the thickness of the package stabilizes, an output signal by multivibrator 290 allows the circuitry illustrated in FIG. 5 to determine the difference between the before deflection thickness and the after deflection thickness. This occurs at time T5.

After the package thickness measurements are taken and compared, multivibrator 300 transmits its output signal which results in the vacuum system turning off and in the lower head retracting. When the vacuum system is turned off, both the upper head and the lower head release their holds on the package and the upper head then continues to retract upwardly to its fully retracted position. Similarly, the lower head moves downwardly towards its fully retracted position.

Since the package is no longer secured to the upper and lower test heads, as the lower head moves downwardly the package is once again picked up by the conveyor system or other package handling system used and the package moves on its normal conveyor system. After a time delay between time T6, when the vacuum system is turned off and the lower head begins to retract, and time T7 when a rejection signal is generated by multivibrator 310, the package will be in position to be moved off the conveyor system onto some reject system. If, on the other hand, the package thickness after deflection and before deflection is within the allowable tolerance, as predetermined, there will not be a signal at the AND gate to be anded with the reject signal from multivibrator 310, and the rejection mechanism will not be utilized and the package will accordingly continue on its normal conveyor system.

Between time T6 and time T7, when the reject signal is generated, time T0 once again takes place by the generation of a signal by the package recognition apparatus 240. This begins the testing sequence with a new package being detected on a package conveyor system.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Test apparatus for determining the quality of flexible packaging of vacuum packaged products, comprising, in combination:
   vacuum means for holding a package to be tested on opposite sides, including
      a first vacuum head for holding the package on one side thereof,
      a second vacuum head for holding the package on another side opposite from the first vacuum head;
   means for moving the vacuum means, including means for moving the first and second vacuum heads relatively away from each other to apply a stress to the package from opposite sides of the package to deflect the package; and
   means for comparing the deflection of the package to a predetermined standard to determine the quality of the package.

2. The apparatus of claim 1 in which the means for moving the vacuum means comprises a first test head and a second test head, and the first test head is secured to the first vacuum head, and the second test head is secured to the second vacuum head.

3. The apparatus of claim 2 in which the first and the second test heads, and the first and second vacuum heads respectively secured thereto, are movable with respect to each other.

4. The apparatus of claim 3 in which the means for moving the vacuum means further includes means for moving the first test head and the second test head towards each other to provide contact between the package and the first and second vacuum heads to hold the package between the said vacuum heads.

5. The apparatus of claim 4 in which the vacuum means for holding a package further includes means for applying a vacuum through the first and second vacuum heads to secure the package to the said vacuum heads upon contact between the said heads and the package.

6. The apparatus of claim 5 in which the means for comparing the deflection of the package includes means for determining the position of the first test head when the first vacuum head of the first test head initially contacts and is secured to the package.

7. The apparatus of claim 6 in which the means for comparing the deflection of the package further includes means for determining the length of travel of the first test head away from the second test head after it has contacted and been secured to the package.

8. The apparatus of claim 3 in which the means for moving the vacuum means further includes means for moving the first test head in a first direction to contact the package and the means for moving the second test head in a second direction to contact the package.

9. The apparatus of claim 8 in which the vacuum means for holding the package to be tested includes vacuum cup means for applying a vacuum to the vacuum package from opposite sides of the package to secure the package to the said vacuum heads after the said vacuum heads have contacted the package.

10. The apparatus of claim 9 in which the means for moving the vacuum means further includes means for moving the first test head in a second direction after the first and second vacuum heads have contacted the package and have been secured thereto on opposite sides of the package to apply a stress on the package secured to the first test head and to the second test head to deflect the package.

11. The apparatus of claim 10 in which the vacuum means further includes control means for controlling the vacuum applied to the first and second vacuum heads.

12. The apparatus of claim 11 in which the control means further includes means for releasing the package after the first test head has moved in a second direction.

13. The apparatus of claim 12 in which the means for moving the vacuum means further includes means for moving the second test head in the first direction after the first test head has moved in the second direction and upon the release of the package.

14. Apparatus for measuring the deflection of a flexible package to determine the quality of the package, comprising in combination:
   first and second test head means movable relative to each other;
   means for moving the first and second test head means relatively towards each other and away from each other;
   first and second vacuum head means secured respectively to the first and second test head means and movably therewith;
   first control means for controlling the movement of the first and second test head means relatively towards each other to contact the package and relatively away from each other to stress and deflect the package;
   second control means for controlling and applying vacuum pressure to the first and second vacuum head means to hold the package; and
   means for measuring the distance the first test head means moves relatively away from the second test head means to measure the deflection of the package.

15. The apparatus of claim 14 in which the means for moving the first and second test head means includes means for moving the second vacuum head means a predetermined distance towards the first test head means to position the package for holding.

16. The apparatus of claim 15 in which the first and second vacuum head means each include means for applying the vacuum pressure to the package to secure and hold the package to the vacuum head means upon contact therewith.

17. The apparatus of claim 16 in which the means for applying the vacuum pressure to the package comprises a plurality of suction cups secured to the first vacuum head means and to the second vacuum head means.

18. The apparatus of claim 15 in which means for moving the first and second test head means further includes a first and a second pneumatic actuator movable in response to a flow of pressurized air to move the vacuum head means secured to the test head means.

19. The apparatus of claim 18 in which the first control means for controlling the movement of the first and the second test head means includes valve means for controlling the flow of pressurized air to the pneumatic actuators.

20. The apparatus of claim 19 in which the second control means for controlling and applying vacuum pressure to the vacuum head means includes a vacuum pump for providing the vacuum pressure and conduit means extending from the vacuum pump to the respective vacuum head means.

21. The apparatus of claim 20 in which the second control means further includes circuit means connected to the valve means of the first control means and to the vacuum pump to sequentially control the movement of the pneumatic actuators and the application of vacuum pressure to the vacuum head means.

22. The apparatus of claim 21 in which the means for measuring the distance the first test head means moves relative to the second test head means includes displacement sensor means secured to and movable with the first test head means for providing a variable output in response to movement of the first test head means.

23. The apparatus of claim 22 in which the means for measuring the distance the first test head means moves further includes comparator means connected to the displacement sensor means for receiving the variable output therefrom and for determining from the said output the deflection of the package.

24. The apparatus of claim 23 in which the comparator means includes circuit means for determining the quality of the package from the determined deflection.

25. The method of determining the quality of packaging of a vacuum packaged product, comprising, in combination, the steps of:

applying a vacuum holding means to opposite sides of a package;

stressing the package to cause deflection of the package by moving the holding means relatively away from each other;

measuring the resulting deflection of the package; and comparing the measurement of deflection of the package to a predetermined standard of quality.

26. The method of claim 25 in which the step of applying a vacuum to opposite sides of a package includes the steps of securing a first vacuum head to a first side of the package and a second vacuum head to a second side of the package opposite the first side.

27. The method of claim 26 in which the step of stressing the package includes the step of moving one of the vacuum heads away from the other vacuum head while the package is secured to both vacuum heads.

28. The method of claim 27 in which the step of measuring the deflection of the package includes the step of allowing the one vacuum head to move upwardly until its upward movement ceases due to a balancing of forces on the package while both heads are still secured to the package.

29. The method of claim 28 in which the step of measuring the deflection of the package includes the steps of providing an output in response to the position of the one vacuum head before it moves away from the other vacuum head and of providing another output in response to its position after it ceases its movement.

30. The method of claim 29 in which the step of measuring the deflection of the package further includes the step of determining the difference between the two outputs provided in response to the positions of the one vacuum head.

* * * * *